United States Patent [19]

Wittwer et al.

[11] 3,941,765

[45] Mar. 2, 1976

[54] PROCESS FOR THE MANUFACTURE OF SYMMETRIC 1:2 CHROMIUM COMPLEXES OF AZO DYES

[75] Inventors: Christian Wittwer, Bottmingen; Emil Bonometti, Basel, both of Switzerland

[73] Assignee: Ciba-Geigy AG, Basel, Switzerland

[22] Filed: Jan. 10, 1974

[21] Appl. No.: 433,012

[30] Foreign Application Priority Data

Jan. 18, 1973 Switzerland.............................. 690/73

[52] U.S. Cl........... 260/151; 260/145 R; 260/145 A; 260/145 B; 260/145 C; 260/146 R; 260/146 D; 260/146 T; 260/147; 260/148; 260/149; 260/150

[51] Int. Cl.².................... C09B 45/06; C09B 45/16

[58] Field of Search........ 260/145 R, 145 A, 145 B, 260/145 C, 146 R, 146 D, 146 T, 147, 148, 149, 150, 151

[56] References Cited

UNITED STATES PATENTS

| | | | |
|---|---|---|---|
| 1,918,938 | 7/1933 | Straub et al..................... | 260/145 B |
| 2,829,139 | 4/1958 | Strobel et al. ...................... | 260/147 |
| 2,891,938 | 6/1959 | Schetty ........................... | 260/145 A |
| 2,906,746 | 9/1959 | Brassel et al..................... | 260/147 X |
| 2,921,061 | 1/1960 | Ackermann et al. ............... | 260/147 |
| 3,185,676 | 5/1965 | Klein........................... | 260/146 R X |

OTHER PUBLICATIONS

Price, "VII, The Chemistry of Metal Complex Dyestuffs," The Chemistry of Synthetic Dyes, K. Venkataraman, Ed., Vol. III, Academic Press: New York, 1970, pp. 334–341.

*Primary Examiner*—Charles F. Warren
*Attorney, Agent, or Firm*—Joseph G. Kolodny; Edward McC. Roberts; Prabodh I. Almaula

[57] ABSTRACT

The present invention relates to a process for the manufacture of 1:2 chromium complexes of metallisable azo dyes, wherein the azo dyes are treated in aqueous solution at pH 7 to 9 with at least the stoichiometric amount of a chromium complex, and, in the course of the chroming, the reaction medium is acidified once or repeatedly to a pH of 6 or less and subsequently brought back again to pH 7 to 9.

5 Claims, No Drawings

PROCESS FOR THE MANUFACTURE OF SYMMETRIC 1:2 CHROMIUM COMPLEXES OF AZO DYES

Attempts to metallise azo dyes with chromium-III salts in the presence of oxalic acid are known from the literature. However, these methods present difficulties because after a short time a number of the chromium compounds precipitate at the pH values necessary for the metallisation. The precipitated chromium compounds are to all intents and purposes lost for the metallisation, so that it is necessary to use a surplus. This surplus not only renders the process less economical, but also poses a problem in its elimination. It is for this reason that the chroming of azo dyes in the presence of oxalic acid has not up till now gained ground for carrying out reactions on an industrial scale, although in the weakly alkaline range it is characterised by a relatively high reaction rate and consequently shorter reaction times can be attained than e.g. in the presence of salicylic acid.

The present invention is based on the surprising observation it is possible to avoid a chromium surplus by reactivating the precipitated chromium compounds by briefly acidifying the mixture.

The invention therefore provides a process for the manufacture of 1:2 chromium complexes of metallisable azo dyes, wherein the azo dyes are treated in aqueous solution at a pH of 7 to 9 with at least the stoichiometric amount of a chromium oxalate complex, and, during the course of the chroming, the reaction medium is acidified one or repeatedly to a pH of 6 or less and subsequently brought back to a pH of 7 to 9. The process is carried out at the temperatures ordinarily employed for chroming operations. Preferably, the reaction is carried out at temperatures between 90°C and 100°C.

The chromium oxalate complex is used in the form of an aqueous solution in which the stoichiometric ratio of chromium to oxalate should be between 1 and 3, preferably between 1:1½ to 1:2.

A rapid metallisation takes place under the indicated conditions, but a part of the chromium oxalate complex is converted into a form that reacts poorly. This can be reactivated by keeping the reaction mixture for a brief time, as a rule between 5 and 60 minutes, at a pH of 6 or less, preferably at a pH of 5 to 4. The lower the pH, the shorter the time required. The reaction mixture is acidified by advantageously using minerals acids, for example hydrochloric or sulphuric acid. The pH is then adjusted again to 7 or 9, whereupon the metallisation is terminated as a rule after a short time, in general after about a further 30 minutes to 2 hours. It may prove necessary to carry out the acidification and alkalisation a second time.

The new chroming method is suitable primarily for the manufacture of symmetric 1:2 chromium complexes. However, if desired it is also possible to use a mixture of metallisable azo dyes, which will yield mixtures of symmetric and asymmetric complexes.

Examples of suitable azo dyes are the known o,o-dihydroxyazo, o-hydroxy-o'-aminoazo, o-carboxy-o'-hydroxyazo or o-carboxy-o'aminoazo dyes, which are also used for the manufacture of chromium complexes by the conventional methods. They can carry sulpho, sulphonamido or sulphone groups, and furthermore can be substituted by the customary non-ionogenic substituents of azo dyes, e.g. by fluorine, chlorine, nitro, lower molecular alkyl or alkoxy groups, aryl, in particular phenyl, and by phenyl radicals which are substituted by chlorine, sulpho groups, or low molecular alkyl, low molecular alkanoylamino, alkoxycarbonylamino or benzoylamino radicals, as well as by carbalkoxy or cyano groups. The term "low molecular" is to be understood herein as meaning radicals with 1 to 4 carbon atoms.

Such azo dyes are obtained e.g. from the following diazo and coupling components:

diazo components:
2-amino-4-chlorophenol
2-amino-4-nitrophenol
2-aminophenol-4,6-dimethylsulphone
2-aminophenol-4-nitro-6-sulphonic acid
2-amino-5-nitrophenol
1-amino-2-hydroxy-4-sulphonaphthalene
1-amino-2-hydroxy-4-sulpho-6-nitronaphthalene
2-amino-4-methoxy-5-chlorophenol
2-amino-4-sulphonamidophenol and N-substituted derivatives thereof
2-amino-4,6-dinitrophenol
2-amino-4-sulpho-benzoic acid
anthranilic acid
2-amino-5-sulphonamidobenzoic acid
2-amino-6-nitro-4-tert. amyl-phenol
2-aminophenol-4-methylsulphone
5-nitro-2-aminophenol-4-methylsulphone
1-amino-2-hydroxynaphthalone-4-sulphonic acid coupling components:
1-hydroxynaphthalene-5-sulphonic acid
1-hydroxynaphthalene-4-sulphonic acid
1-hydroxynaphthalene-8-sulphonic acid
1-hydroxynaphthalene-3,6-bis-(N-methylsulphonamide)
2-naphthol
2-hydroxy-7-acetylaminonaphthalene
2-naphthol-6-sulphonamide
1-phenyl-3-methyl-pyrazolone-(5)
1-(3'-sulphonamidophenyl)-3-methyl-pyrazolone-(5)
1-(3'-chlorophenyl)-3-methyl-pyrazolone-(5)
1-(3'-sulphophenyl)-3-methyl-pyrazolone-(5)

Further symmetric 1:2 chromium complexes of azo dyes for the manufacture of which the process according to the invention is suitable are described in British Pat. Nos. 684646, 667168, 724157, 797046, 727535, 775005 and 774884.

The following Example illustrates the invention, the parts being by weight.

EXAMPLE 41.4 parts of the azo dye of the formula

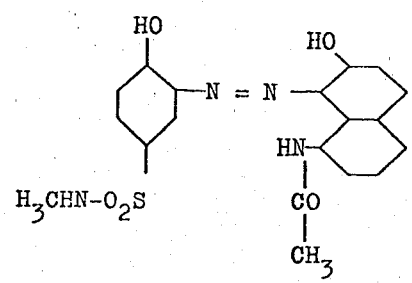

are stirred in 500 parts of water and treated with a chromium oxalate solution which has been obtained by boiling 3.8 parts of $Cr_2O_3$ (chromium-II-oxide hydrate) and 9.0 parts of oxalic acid in 50 parts of water for 1/2 hour to 1 hour and bulking with water to 110 cm$^3$. The pH is adjusted to 8 with sodium hydroxide solution. The reaction mixture is heated to 95°C, bulked to 1000 cm$^3$ and kept at a pH of 8.0 to 8.5. After 1 hour the pH is adjusted to 4.0 by addition of hydrochloric acid and after a further 30 minutes, sodium hydroxide solution is added in sufficient amount to raise the pH from 8.0 to 8.5. The mixture is allowed to react for a further hour and the dye is subsequently isolated by spray drying or by salting out with 50 parts of common salt.

It is possible to chrome the following azo dyes in analogous manner:

2-aminophenol-4-methylsulphone → 1-carbomethoxyamino-7-naphthol 2-amino-4-chlorophenol-5-sulphonamide → 1-phenyl-3-methyl-5-pyrazolone 2-aminophenol-4-sulphonamide → 1-(4'-chlorophenyl)-3-methyl-5-pyrazolone 1-amino-2-hydroxynaphthalene-4-sulphonic acid → 2-naphthol 1-amino-2-hydroxynaphthalene-4-sulphonic acid → 1-phenyl-3-methyl-5-pyrazolone.

We claim:

1. In a process for the manufacture of 1:2 chromium complexes of metallisable azo dyes, wherein the azo dyes are treated in aqueous solution at pH 7 to 9 with at least the stoichiometric amount of chromium oxalate solution, the improvement comprising acidifying the reaction medium during the course of the chroming once or repeatedly to a pH of 6 or less to reactivate precipitated chromium compounds and readjusting the pH to pH 7 to 9 to complete the metallization process.

2. A process according to claim 1, wherein an aqueous chromium oxalate solution is used which contains 1 to 3 molecules of oxalate for each chromium atom.

3. A process according to claim 1, wherein the process is carried out at temperatures between 90°C and 100°C.

4. A process according to claim 1, wherein the reaction mixture is kept for 10 minutes at a pH of 4 to 5.

5. A process according to claim 1, wherein azo dyes are metallised which contain a sulphonic acid or sulphonamide group.

* * * * *